United States Patent
Brazier

(10) Patent No.: US 6,767,385 B2
(45) Date of Patent: Jul. 27, 2004

(54) PRODUCTION METHOD USING PERMEATION OF AT LEAST TWO GASEOUS FLUXES FROM A GASEOUS MIXTURE, AND A PRODUCTION INSTALLATION FOR IMPLEMENTING THIS METHOD

(75) Inventor: Arnaud Brazier, Charenton-le-Pont (FR)

(73) Assignee: L'Air Liquide, Société Anonyme à Directoire et Conseil de Surveillance pour l'Etude et l'Exploitation des Procédés Georges Claude, Paris (FR)

(*) Notice: Subject to any disclaimer, the term of this patent is extended or adjusted under 35 U.S.C. 154(b) by 0 days.

(21) Appl. No.: 10/237,309

(22) Filed: Sep. 9, 2002

(65) Prior Publication Data

US 2003/0047068 A1 Mar. 13, 2003

(30) Foreign Application Priority Data

Sep. 11, 2001 (FR) .......................... 01 11727

(51) Int. Cl.[7] .............................. B01D 53/22
(52) U.S. Cl. ................................ 95/55; 96/9
(58) Field of Search ................ 95/45, 47–55; 96/4, 7, 9

(56) References Cited

U.S. PATENT DOCUMENTS

| | | | | |
|---|---|---|---|---|
| 3,713,271 A | * | 1/1973 | Franz et al. ............ | 95/53 |
| 4,180,388 A | * | 12/1979 | Graham et al. ......... | 95/55 |
| 5,064,446 A | * | 11/1991 | Kusuki et al. .......... | 95/53 |
| 5,281,253 A | * | 1/1994 | Thompson .............. | 95/22 |
| 5,314,528 A | * | 5/1994 | Monereau .............. | 95/55 |
| 5,378,263 A | * | 1/1995 | Prasad ................... | 95/54 |
| 5,538,536 A | * | 7/1996 | Fuentes et al. ......... | 95/45 |
| 5,709,732 A | * | 1/1998 | Prasad ................... | 95/45 |
| 5,785,741 A | * | 7/1998 | Li et al. ................. | 96/4 |
| 5,827,351 A | * | 10/1998 | Prasad et al. .......... | 95/45 |
| 5,855,647 A | | 1/1999 | Li et al. | |
| 5,858,065 A | * | 1/1999 | Li et al. ................. | 95/45 |
| 5,928,415 A | * | 7/1999 | Girard et al. ........... | 96/4 |
| 6,168,649 B1 | * | 1/2001 | Jensvold et al. ........ | 95/47 |
| 6,197,090 B1 | * | 3/2001 | Yamashita et al. ..... | 95/12 |
| 6,221,131 B1 | * | 4/2001 | Behling et al. ......... | 95/50 |
| 6,235,087 B1 | * | 5/2001 | Chevalier et al. ...... | 96/9 |
| 6,387,157 B1 | * | 5/2002 | Yamashita ............. | 95/45 |
| 6,511,521 B1 | * | 1/2003 | Parchamazad ......... | 48/128 |

FOREIGN PATENT DOCUMENTS

| | | |
|---|---|---|
| EP | 0 7899 634 A | 10/1987 |
| EP | 0700 709 A1 * | 3/1996 |
| FR | 2 757 081 A | 6/1998 |

OTHER PUBLICATIONS

French Search Report FR 0111727.

* cited by examiner

Primary Examiner—Robert H. Spitzer
(74) Attorney, Agent, or Firm—Linda K. Russell

(57) ABSTRACT

This method permits the production of at least two gaseous fluxes enriched in a permeable component from a gaseous mixture wherein the fluxes are considerably different, compared to the gaseous mixture. A first permeation unit (20) is supplied by the gaseous mixture feed. A second permeation unit (22) is supplied by the non-permeate produced by the first unit (20). The permeate produced by the second unit (22) which forms a first enriched flux is then sent to the third permeation unit (24) to form a second enriched flux.

16 Claims, 4 Drawing Sheets

| FLUX | FLUX I | FLUX II | FLUX III | FLUX IV |
|---|---|---|---|---|
| COMPOSITION (MOLAR %) $H_2$ $N_2$ $CH_4$ Ar | 60 23 12 5 | 13.2 50.1 27.4 9.3 | 90.15 5.50 1.91 2.44 | 99.89 0.04 0.01 0.05 |
| PARTIAL FLOW (Nm³/Hr) $H_2$ $N_2$ $CH_4$ Ar | 5064 1941 1013 422 | 449 1703 930 316 | 3901 238 82.7 106 | 715 insignificant insignificant insignificant |
| TOTAL FLOW (Nm³/Hr) | 8440 | 3398 | 4327 | 715 |
| PRESSURE (absolute bar) | 120 | 117 | 30 | 30 |

*FIG. 2*

| FLUX | FLUX A | FLUX B | FLUX C | FLUX D |
|---|---|---|---|---|
| COMPOSITION (MOLAR %) $H_2$ $N_2$ $CH_4$ Ar | 60 23 12 5 | 13 50.2 27.35 9.41 | 90.79 5.14 1.79 2.29 | 99 0.5 0.2 0.3 |
| PARTIAL FLOW (Nm³/Hr) $H_2$ $N_2$ $CH_4$ Ar | 5064 1941 1013 422 | 445 1716 935 321 | 3912 222 77 98 | 707 3.89 1.29 2.06 |
| TOTAL FLOW (Nm³/Hr) | 8440 | 3417 | 4309 | 715 |
| PRESSURE (absolute bar) | 120 | 119.5 | 30 | 30 |

*FIG. 5*

PRODUCTION METHOD USING PERMEATION OF AT LEAST TWO GASEOUS FLUXES FROM A GASEOUS MIXTURE, AND A PRODUCTION INSTALLATION FOR IMPLEMENTING THIS METHOD

This invention concerns a production method by permeation of a gaseous mixture containing a permeable component, of at least two gaseous fluxes enriched with said component as compared to the gaseous mixture, the respective contents of these at least two fluxes enriched with said component being substantially different. Advantageously one of the enriched fluxes is hydrogen, that can be used, for instance in chemical reactors.

In the following description, the terms "substantially different contents" will mean:
  contents in the most permeable component which differ by at least 4 or 5 points, in other words for example, where the "less enriched flux/more enriched flux" pairs are about 70%/90%, 85%/95%, or 95%/99%;
  and/or contents of at least one impurity are in a ratio of at least 2 or 3, in other words for example, for one impurity, the "impurity contents of the less enriched flux/impurity content of the more enriched flux" pairs are approximately 3%/1%, 1%/0.2% or 1000 ppm/100 ppm.

This invention is applicable to the production of such fluxes from gaseous mixtures produced from a chemical unit where one or several components can be recovered and/or recycled to form new reagents for use in this chemical unit. For example, in ammonia synthesis, the methods of the type described above are suitable for the production of hydrogen-enriched fluxes and recycled in the ammonia synthesis unit, as well as the production of a flux of very pure hydrogen used in another process.

The invention can also be used with refinery gas that contains, for example, between 30 and 85% of hydrogen moles. This invention permits to produce with a good global extraction yield both a highly enriched hydrogen flux, as compared to the initial mixture, as well as one or two other mediumly enriched fluxes.

The production of a flux highly enriched in the most permeable component is well known, for example from the publication "Pressure Swing Absorption" by Ruthven et al, paragraph 8.4. However the production of such a flux with a sufficient extraction yield requires internal recirculation that is very costly in investment and energy, as confirmed by the authors. Without these internal recirculations, it is possible to obtain a pure permeate, but with an extraction yield so low that the method is generally too expensive.

Another method is known, for example from the documents U.S. Pat. No. 4,180,388 and EP-A-0-700 709, where the gaseous mixture is subject to arrangements of permeators in series on the waste from the previous permeator, the permeate of each permeator forming a hydrogen-enriched flux with a different content.

However these arrangements or layouts do not permit the acquisition of enriched fluxes with a very high content. In the document U.S. Pat. No. 4,180,388, the maximum enriched hydrogen content is that produced by the first permeator fed with the gaseous mixture, and does not exceed the hydrogen count obtained from the second permeator by more than slightly over two points.

The purpose of this invention is to propose a separation method by permeation that is easy to set up and that permits to obtain at least two enriched fluxes, one of which has a very high purity level, while maintaining a high global extraction yield.

For this purpose, the invention aims at furnishing a method in which a first permeation unit is supplied by the gaseous mixture, a second permeation unit is supplied by the non-permeate from the first permeation unit, the permeate produced by the second unit forming a first enriched flux, and a third permeation unit is supplied by the permeate from the first permeation unit, the permeate produced by the third permeation unit forming a second enriched flux with a higher component content than the first flux.

According to other features of this method, either used together, or according to all the combinations technically possible:
  the flow of the second enriched flux can be adjusted;
  the content of said component in the second enriched flux can be adjusted according to the pressure on the non-permeate side of the third permeation unit;
  the non-permeate of the third permeation unit forms a third flux with a weaker component content than that of the second flux.

This invention is also aimed at furnishing a method of supplying a processing unit with at least one gaseous flux rich in one permeable component, wherein at least two enriched fluxes can be produced using a method such as that described above, the processing unit being supplied by at least one of the first and third enriched fluxes.

The invention will be easily understood when reading the following description of embodiments, given simply as examples, in reference to the appended drawings wherein:

FIG. 2 is a material balance chart showing the different points of the installation represented in FIG. 1;

FIG. 5 is a material balance chart showing the different points of the installation represented in FIG. 4.

Figure 1:
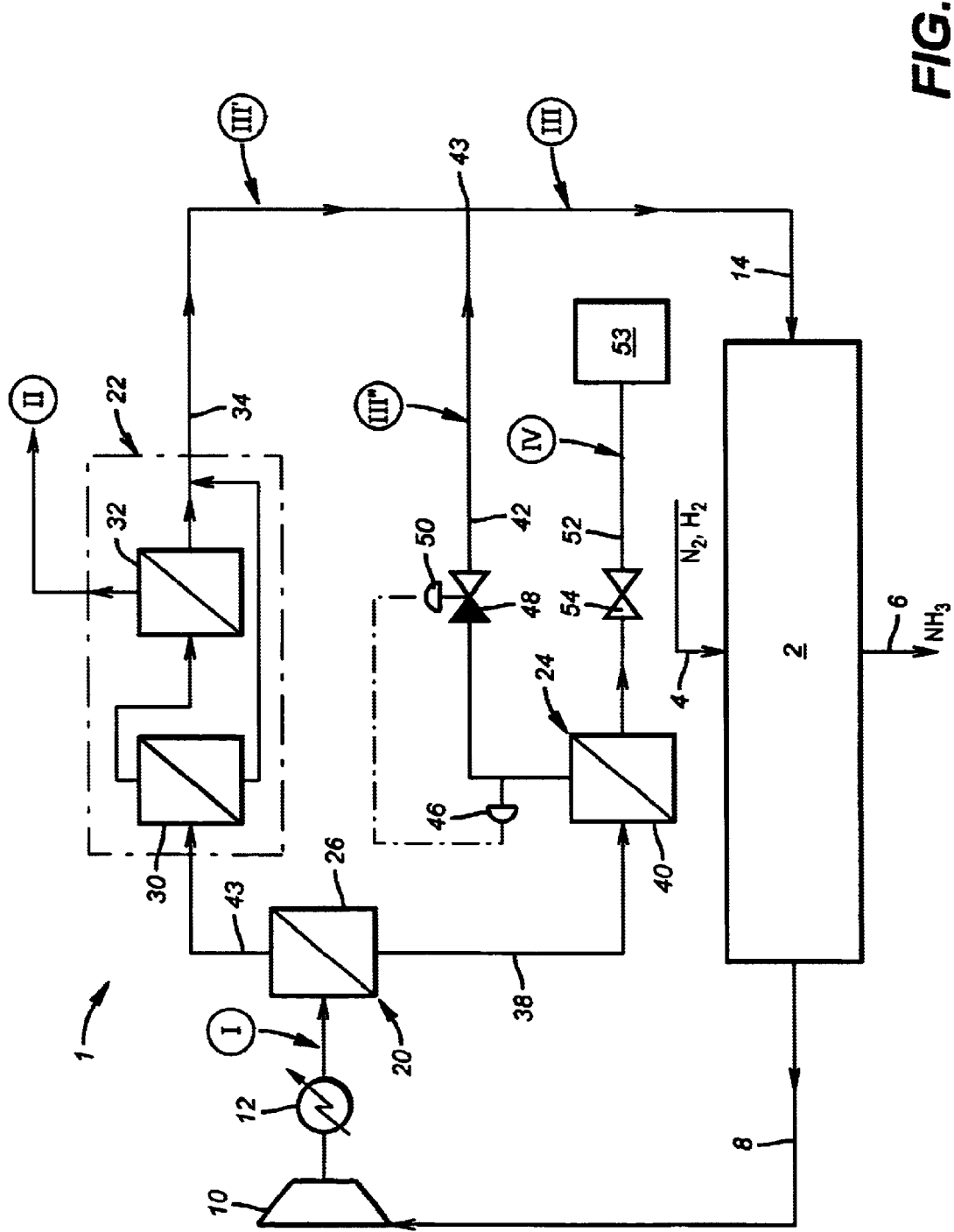
FIG. 1 is a block diagram of a gaseous flux production installation using permeation according to the invention, associated with a chemical unit.

The example shown in FIG. 1 represents a production installation 1 of a gaseous flux by permeation according to the invention and a chemical unit 2 for ammonia synthesis. The ammonia synthesis unit is a well-known principle and is composed of a reagent supply line 4, especially hydrogen $H_2$ and Nitrogen $N_2$, and an evacuation line 6, for the resulting $NH_3$.

The installation 1 is connected to unit 2 by a purge line 8 for the wastes from unit 2, including a compressor 10 and a cooling heat exchanger 12. Installation 1 has been adapted to separate by permeation the residual gaseous mixture from chemical unit 2 in order to recover part of the hydrogen $H_2$ that is present, for re-introduction into the ammonia synthesis unit 2 via the return line 14.

Installation 1 is principally composed of three permeation units: 20, 22, and 24. Each permeation unit comprises one or several membrane permeator groups, known per se.

Generally, a permeator comprises a supply inlet supplying the gaseous mixture to be separated, a permeate outlet, in other words an evacuation line for the gaseous mixture that has permeated through the permeator membrane, and a non-permeate outlet, in other words, an evacuation line for the remaining gaseous mixture that has entered the system but has not permeated through the membrane. When processing large quantities of gas it is common practice to form a group of permeators arranged in a line or parallel to increase the number of separation membranes.

More precisely, as shown in FIG. 1, the first permeation unit 20 comprises a single membrane permeator 26 whose supply side is connected to the outlet of compressor 10 downstream the exchanger 12. The second permeation unit 22 is connected by line 28 to the non-permeate outlet of the first unit 20. This second unit 22 comprises a triple aligned membrane permeator 30, and a single membrane permeator 32, arranged in a line on non-permeate, in other words, the non-permeate outlet of permeator 30 is connected to the supply inlet of permeator 32, the outlets of permeators 30 and 32 being connected together to form a permeate outlet 34 for unit 22. In turn, this permeate outlet 34 is connected to the back flow line 14 of chemical unit 2.

The third unit 24, is connected via line 38 to the permeate outlet of the first unit 20. This third unit 24 comprises a single membrane permeator 40, with a non-permeate outlet 42 connected to the back flow line 14 of chemical unit 2 at a mixing point 43 with the permeate outlet 34 of second unit 22. Advantageously the non-permeate outlet line 42 is equipped with a pressure detector, and downstream this detector, with a depressurization valve 48 controlled by a gas pressure regulator 50 for regulating the pressure of the gas that passes through valve 48, this regulator 50 being connected to the pressure detector 46.

As a variant, the detector 46 can be positioned on the line 38 connected to the supply side of the third unit 24; the regulator 50 will register the pressure loss between lines 38 and 42.

Unit 24 also includes a permeate outlet line 52, beneficial because of it is equipped with a gas flow control valve 54 for passing gas. This line 52 has been adapted to supply a downstream installation 53.

The method according to this invention is now illustrated by the description of the function of installation 1. For this purpose, the ammonia synthesis unit 2 supplies installation 1 with a gaseous mixture: an example of the composition, the pressure, and the flow at point identified I in FIG. 1 is given in column "flux 1" of the table in FIG. 2.

The non-permeate outlet of the first permeation unit 20 supplies the second permeation unit 22 so that on one hand the non-permeate outlet of the latter presents the characteristics shown in column II of the table in FIG. 2, and on the other hand, the permeate outlet of unit 22 partially supplies the back flow line 14 of the chemical unit 2. Flux II is strongly depleted in hydrogen and is not re-used.

The permeate outlet from the first unit 20 supplies the third permeation unit 24 so that the non-permeate outlet of the latter, identified as III'', also supplies the back flow line 14 of chemical unit 2 after mixing in 43 with the permeate of unit 22, identified as III'. The characteristics of the hydrogen enriched gas that are therefore recycled in unit 2, identified as III, are described in detail in column "flux III" in the table in FIG. 2. Flux III is hydrogen enriched. Moreover, the permeate outlet of unit 24 supplies the installation 53 downstream, described previously, and the characteristics of the extremely pure hydrogen gaseous flux correspond with the description in note 1V in column "flux IV" of the chart described above.

Figure 3:
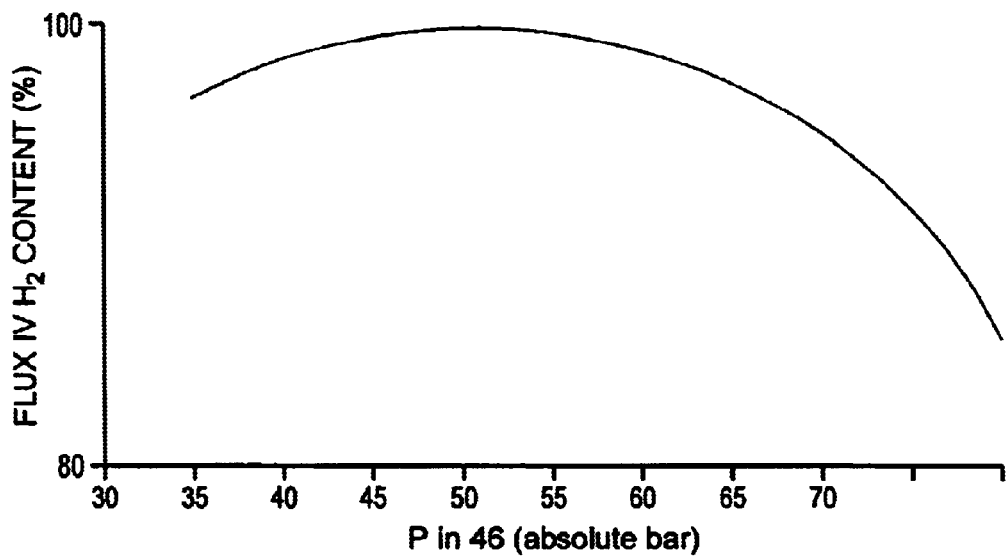
FIG. 3 is a diagram illustrating the variations of the hydrogen content of an enriched flux produced by the installation represented in FIG. 1.

The purity of the hydrogen in flux IV can be adjusted according to the needs of the installation downstream 53, described previously, through the working pressure of the third permeation unit 24. In fact, as is illustrated in the diagram in FIG. 3, the hydrogen content of this flux IV depends directly on the pressure of the non-permeate at the outlet on unit 24. Regulator 50 is used to control the pressure and as a result, also the content. As an example, the characteristics of flux IV of FIG. 2 show that the pressure measured by pressure detector 46 is approximately 48 absolute bar.

More generally, in the case of use in ammonia synthesis, the method according to the present invention is also capable of producing flux IV with a hydrogen content of at least 99 molar % for a flow of over 10% more than that of the gaseous mixture. In the same manner, this method can produce flux IV at a flow of at least 5% of that of the gaseous mixture with a hydrogen content of over 99.8 molar %. More precisely, in the cases used as examples, a flux of 715 Nm$^3$/h can be obtained with a hydrogen content of 99.9 molar % from a gas flow with a charge/load of 8440 Nm$^3$/h.

Therefore, the method according to this invention permits the acquisition of a flux IV with a very high hydrogen content, and a flux III, with a lesser hydrogen content, but over 90 molar %, these two fluxes guarantee a global extraction hydrogen yield of more that 91% using this method.

As a comparison, a unit designed to produce pure hydrogen only, in other words, the equivalent of flux IV, composed of two permeation units in cascade position, such as units 24 and 26 shown in FIG. 1, would produce a hydrogen extraction yield lower than 15%.

Therefore it can be deduced that this type of arrangement or layout with two units may be more simple and less expensive in investment than the layout described in this invention, but it is far less economical compared to the respective extraction yields: less than 15% for the first and more than 91% for the second.

Another comparison showing the results of a layout composed of two permeation units set up in line as described for example in above mentioned U.S. Pat. No. 4,180,388, and illustrated in the diagram in FIG. 4, has been calculated as representing the working conditions of the previous example. The results of these calculations at the points on the installation noted as A, B, C and D are shown in the chart in FIG. 5.

Figure 4:
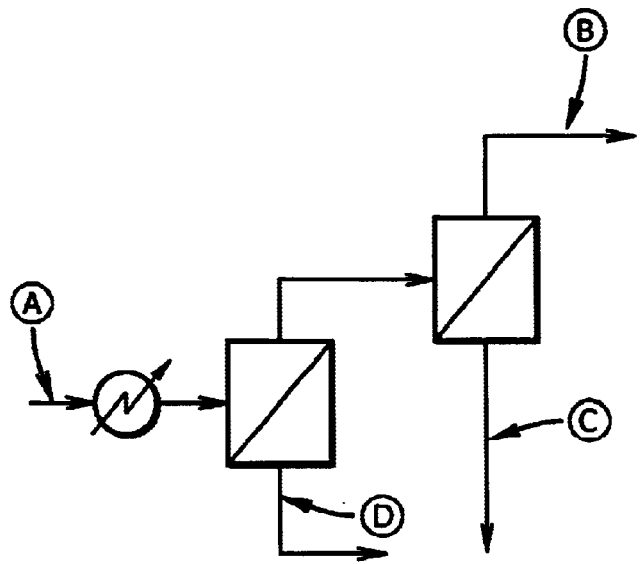
FIG. 4 is a simplified view similar to that shown in FIG. 1, but illustrating a prior art installation.

It can be seen that the arrangement in FIG. 4 guarantees the same flow of pure hydrogen (Flux D) or 715 Nm$^3$/h, but with a purity level of 99.0 instead of 99.9% which means that the impurity content in the flux D is multiplied by 10 compared to that in flux IV.

This arrangement is not suitable when the hydrogen produced in certain compounds must be eliminated because they can form poisons for the downstream processing, such as methane in the previous example, where the content must be lower than or equal to 100 ppm.

One advantage of this method consists of the fact that if the requirements for high purity hydrogen in Flux IV is not continuous, valve 54 is set to adjust the flow rate of flux IV, or even switched to closed position, so that the total quantity of the recovered hydrogen is recycled into the ammonia synthesis unit 2 by means of flux III.

Figure 6:
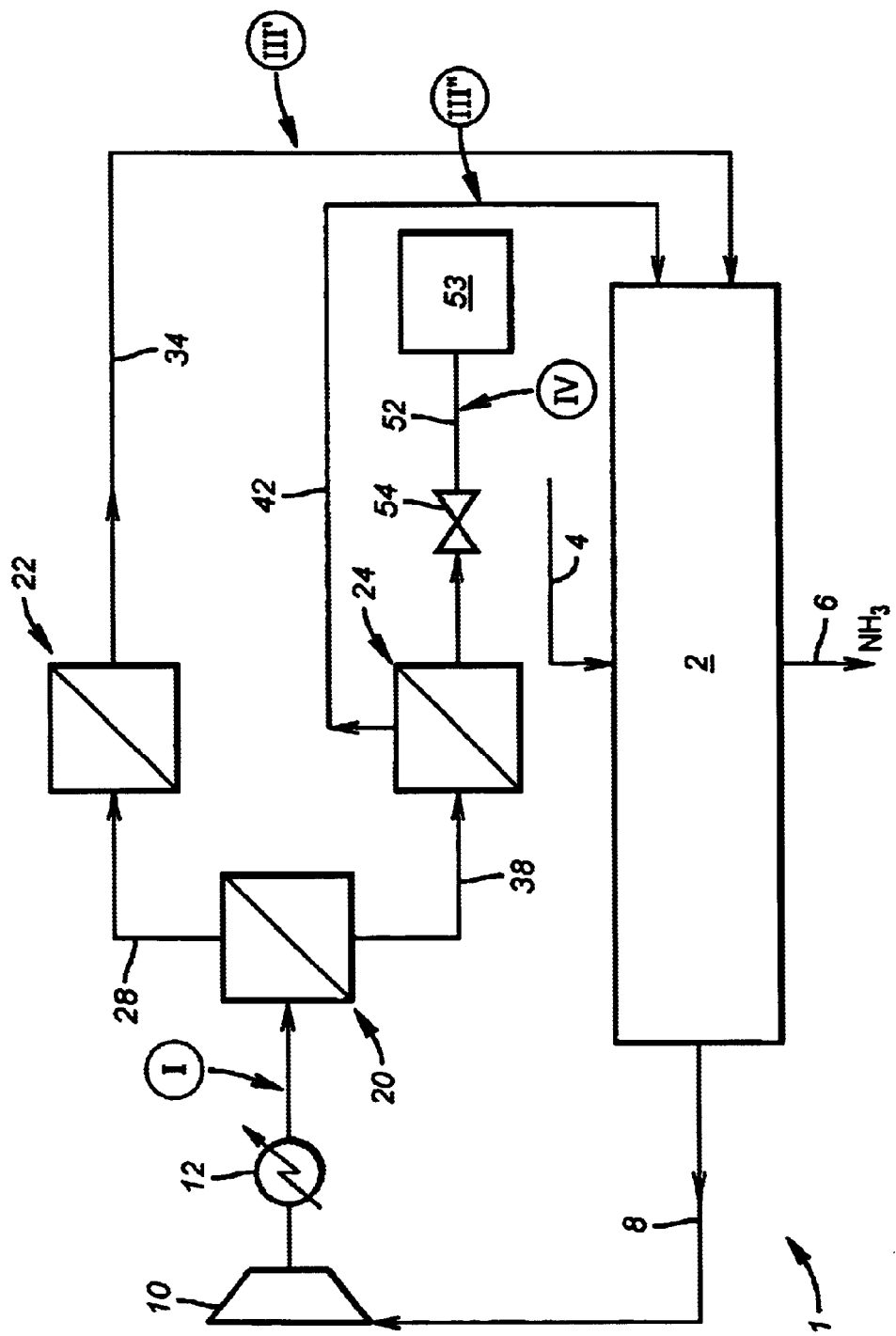
FIG. 6 is a view similar to that in FIG. 1 showing a variant of the installation according to this invention.

FIG. 6 shows a variant of the installation embodiment according to this invention, that is identical to that of FIG. 1 except for the fact that the non-permeate outlet of the permeation unit 24 is connected directly to chemical unit 2, in a separate inlet from that of the permeate outlet flux on unit 22. In this manner, installation 1 in FIG. 6 can supply three hydrogen enriched fluxes with different hydrogen contents: flux IV, a flux III on exit from permeate outlet on unit 22, and a flux III" on exit from permeate outlet on unit 24.

This variant takes advantage of the initial separation of the fluxes that make up flux III" shown in FIG. 1, so that fluxes III" and flux III'" can be recycled separately at unit 2 level, for example, at different stages of a compressor, on two levels of a reactor, etc, while remaining strictly within the context of this invention.

In addition, the method according to the invention has also been applied as an example to refinery gas containing approximately 55% hydrogen at 92 absolute bar. As well as recovering 24% of the hydrogen at a purity level over 93.5 molar %, this method can also produce an enriched flux of hydrogen of 70% thus providing a global extraction yield of over 91%.

In general, the method and the installation according to the invention produce fluxes enriched with the most permeable gas, with a very high global extraction yield, and at the same time, providing one flux with an extremely high content of the most permeable component compared to the initial gaseous mixture.

It should be emphasised that the examples developed previously were obtained using a specific type of membrane—those manufactured by the MEDAL Company, Wilmington, USA. However the method according to this invention is just as applicable with membranes that possess other characteristics, the installation performance according to the invention will be modified accordingly. For example, the working temperatures of each of the permeation units and the permeation surfaces involved, can be adjusted to take these characteristics into consideration.

Moreover, according to the nature and/or the pressure of the gaseous mixture of the method set-up according to this invention, it is possible to connect upstream, downstream or in each permeation unit, standard equipment used in gas permeation fields, such as exchangers, liquid/vapour separator vessels. These complementary layouts are familiar practice in this technical field and can be applied without deviating from the field of this invention as defined in the claims listed below.

What is claimed is:

1. A method of separating hydrogen from a gaseous mixture comprising at least hydrogen ($H_2$), wherein the method comprising the steps of:
   i) supplying a first permeation unit (20) with the gaseous mixture;
   ii) supplying a second permeation unit (22) with a non-permeate produced by the first permeation unit (20), the permeate produced by the second unit 22 forming a first enriched hydrogen flux (flux III');
   iii) supplying a third permeation unit (24) with a permeate produced by the first permeation unit (20), the permeate produced by the third unit (24) forming a second enriched hydrogen flux (flux IV); and
   wherein said method produces at least two substantially different fluxes enriched with hydrogen.

2. Method according to claim 1, wherein the flow of second enriched hydrogen flux (flux IV) can be adjusted.

3. Method according to claim 1, wherein the content of second enriched hydrogen flux (flux IV) is adjustable in relation to the pressure on the non-permeate side of the third permeation unit (24).

4. Method according to claim 1, wherein the non-permeate of the third permeation unit (24) forms a third flux (flux III") with a lower content of hydrogen than the second enriched flux (flux IV).

5. A method according to claim 4, wherein supplying an ammonia synthesis processing unit (2) with at least one gaseous flux rich in at least hydrogen, whereby at least two enriched fluxes are produced, and wherein the processing unit (2) is being supplied with at least one of said first (III') and third (III'") enriched fluxes.

6. Method according to claim 5, wherein the first (III') and third (I'") enriched hydrogen fluxes are mixed upstream of the processing unit (2) to form a single enriched hydrogen flux (flux III) to supply said unit, and whereby the pressure of the first and third fluxes are adjusted considerably before they are mixed together.

7. Method according to claim 5, wherein the first (III') and third (III'") enriched hydrogen fluxes are sent into the processing unit (2) through separate inlets.

8. Method according to claim 5, wherein the gaseous mixture to be separated is a mixture produced by the processing unit (2).

9. Method according to claim 5, wherein the processing unit (2) creates the gaseous mixture comprising of purge products from said unit (2) and hydrogen is to be recovered.

10. Method according to claim 9, wherein the hydrogen content of the second flux (IV) is at least about 99 molar % for a flow of over about 10% more than that of the gaseous mixture.

11. Method according to claim 9, wherein the flow of the second flux (IV) is at least about 5% of that of the gaseous mixture for a hydrogen content of over about 99.8 molar %.

12. Method according to claim 8, wherein the gaseous mixture is a refinery gas, and wherein hydrogen is to be recovered.

13. Method according to claim 1, wherein said gaseous mixture further comprises of at least one component selected from the group consisting of: nitrogen, methane and argon.

14. Method according to claim 1, wherein said method utilizes at least one compressor.

15. Method according to claim 1, wherein said method utilizes no more than one compressor.

16. A method of separating hydrogen from a gaseous mixture comprising at least hydrogen (H2); wherein the method comprising the steps of:
   i) supplying a first permeation unit (20) with the gaseous mixture;
   ii) supplying a second permeation unit (22) with a non-permeate produced by the first permeation unit (20), the permeate produced by the second unit 22 forming a first enriched hydrogen flux (flux III');
   iii) supplying a third permeation unit (24) with a permeate produced by the first permeation unit (20), the permeate produced by the third unit (24) forming a second enriched hydrogen flux (flux IV) and a non-permeate produced by the third unit forming a third flux (flux III"), and
   wherein said method produces at least two substantially different fluxes enriched with hydrogen and whereby said method utilizes one compressor.

* * * * *

UNITED STATES PATENT AND TRADEMARK OFFICE
CERTIFICATE OF CORRECTION

PATENT NO. : 6,767,385 B2 Page 1 of 1
DATED : July 27, 2004
INVENTOR(S) : Arnaud Brazier It is certified that error appears in the above-identified patent and that said Letters Patent is hereby corrected as shown below:

<u>Column 6,</u>
Line 10, replace the reference "l'''" (1 triple prime) with -- lll''' -- (3 triple prime).

Signed and Sealed this

Twenty-eighth Day of June, 2005

JON W. DUDAS
*Director of the United States Patent and Trademark Office*